(No Model.)

L. R. FAUGHT.
DEVICE FOR HOLDING METAL CUTTERS.

No. 327,151. Patented Sept. 29, 1885.

ATTEST.
J. Henry Kaiser
Harry L. Amer

INVENTOR.
L. R. Faught
by J. Snowden Bell
Atty

UNITED STATES PATENT OFFICE.

LUTHER R. FAUGHT, OF PHILADELPHIA, PENNSYLVANIA.

DEVICE FOR HOLDING METAL-CUTTERS.

SPECIFICATION forming part of Letters Patent No. 327,151, dated September 29, 1885.

Application filed June 23, 1885. (No model.)

*To all whom it may concern:*

Be it known that I, LUTHER R. FAUGHT, of the city and county of Philadelphia, in the State of Pennsylvania, have invented certain new and useful Improvements in Devices for Holding Metal-Cutters, of which improvements the following is a specification.

In an application for Letters Patent filed by me under date of November 21, 1884, Serial No. 148,516, I have set forth an improved chuck or holding device specially designed for use in connection with a cutter having four or more continuous cutting ribs or wings projecting from and formed in one piece with a central bar or core, and have illustrated but not claimed therein the adaptation thereof in holding boring bars or stocks provided with separate and removable boring or facing cutters, or both. My present invention relates to such adaptation, and the improvements claimed are hereinafter fully set forth.

Figure 1:
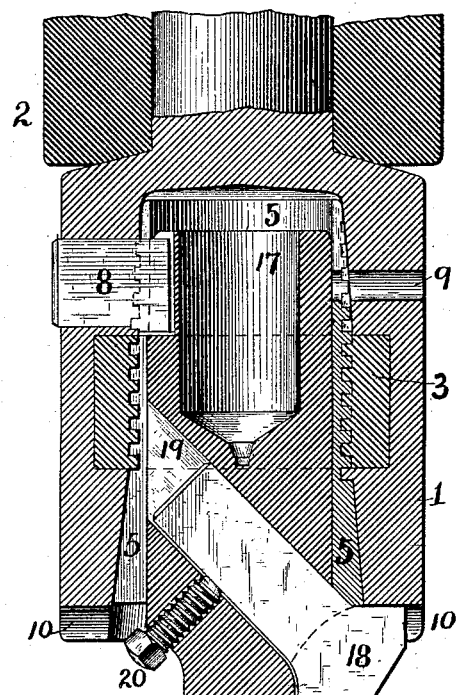
Figure 2:
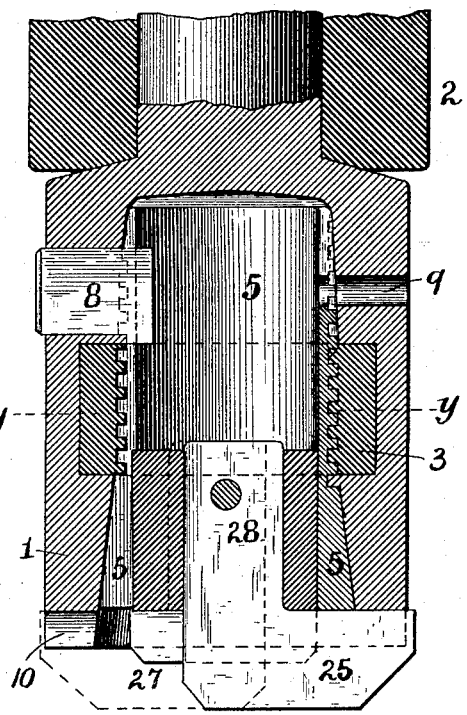
Figure 3:
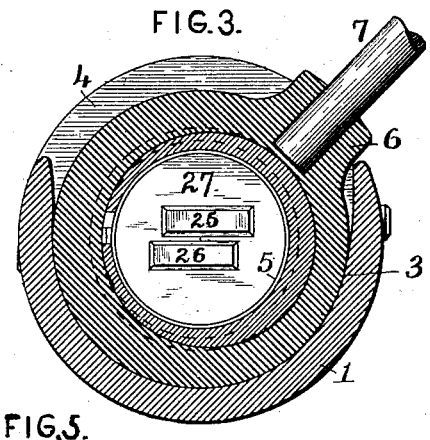
Figure 4:
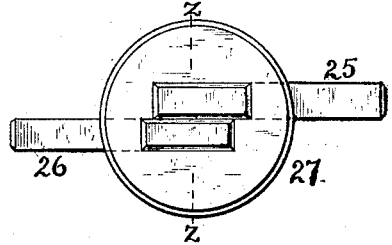
Figure 5:
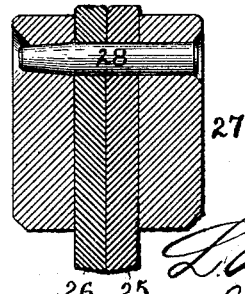

In the accompanying drawings, Figure 1 is a longitudinal central section through a cutter-chuck embodying my invention, the same being shown as holding a boring-bar fitted with separate and removable boring and facing cutters; Fig. 2, a longitudinal central section through the same when holding a pair of facing-cutters; Fig. 3, a transverse section through the same at the line $yy$ of Fig. 2; Fig. 4, a plan or top view of the facing-cutters and their socket, and Fig. 5 a vertical central section through the same at the line $zz$ of Fig. 4.

In the practice of my invention, I provide a chuck or socket, 1, which may either be formed integral with the spindle 2 of a drilling or boring machine, or preferably, as shown, be made separate therefrom and fixed therein in the usual manner. The chuck 1 is bored out centrally in conical or tapered form, the greater diameter of its bore being at the end furthest from the spindle 2, and is recessed around its bore at and adjacent to the middle of the length thereof, to receive a circular nut, 3, having a substantial thread, which is inserted through a lateral opening, 4, in the chuck, corresponding in width with the diameter of the nut, and fits accurately within the recess thereof concentric with the bore. A sleeve or bushing, 5, which is rendered flexible by being longitudinally split or divided on one side throughout its length, and is provided with an external screw-thread engaging the thread of the nut 3, is fitted in the bore of the chuck 1, the periphery of the sleeve being of corresponding taper with the bore above and below its middle portion, which engages the nut 3, and its inner surface being continuously tapered or conical from its upper to its lower end. A lateral hub or boss, 6, is formed upon the nut 3, for the insertion of an operating-lever, 7, by which the nut may be partially rotated within the recess of the chuck, and in such rotation the nut, by the engagement of its thread with that of the sleeve 5, will compress the latter firmly upon a socket or stem inserted in its tapered bore. Rotation of the sleeve 5 is prevented by a key, 8, fitting in a keyway in the chuck 1, and in an enlarged recess at the upper end of the longitudinal division of the sleeve 5, said key being driven into position by a drift inserted through an opening, 9, in the opposite side of the chuck. Radial slots 10 are formed in the lower end of the chuck 1 from its bore to its periphery, for the reception of facing-cutters, as presently to be described. The provision of a tapered outer bearing-surface on the sleeve 5 on each side of the nut 3 enables the clamping action of the sleeve to be exerted uniformly throughout the length of an inserted socket or stem, and utilizes the greatest practicable proportion of the periphery as bearing-surface.

So far as above described, the device corresponds with that set forth in my application, Serial No. 148,516, before referred to, and is not therefore, *per se*, herein claimed. Its application in holding a boring bar or stock provided with separate and removable boring and facing cutters, which will now be described, is illustrated in Fig. 1. The boring-bar 17 is turned to a taper corresponding with the bore of the sleeve 5, and is provided with a lateral recess to receive the head or inner end of the key 8, by which it is held as against rotation independently of the sleeve 5, and is locked firmly therein by the compression thereof by the movement of the nut 3, as in the case of the continuous cutter and its bushing. In the instance shown the boring-bar 17 carries a facing-cutter, 18, which fits in one of the slots 10 at the bottom of the chuck 1, and is secured in an inclined transverse slot, 19, in the boring-bar by a set-screw, 20, as in my Letters Patent No. 241,482, dated May 17, 1881. The boring-bar is also provided, adjacent to its lower end, with a pair of boring-cutters, 21 22, fitting in diametric slots at right angles one to the other, the cutter 21 passing through and bearing against an opening, 23, in the cutter 22, and both cutters being secured in position by a longitudinal clamping-screw, 24, engaging a thread in the boring-bar, as in my Letters Patent No. 302,831, dated July 29, 1884. The bar 17 and its accessories may be inserted and secured in and removed from the chuck with the same facility as a continuous cutter and its bushing, and the substitution of one for another may be readily and quickly effected as from time to time required.

Figs. 2 to 5, inclusive, illustrate the application of the chuck for holding a pair of facing-cutters, 25 26, through the intermediation of a cutter-socket, 27, which is turned upon its periphery to fit within the bore of the socket 5, and is slotted longitudinally adjacent to and on opposite sides of a transverse plane, to receive the vertical portions of the L-shaped facing-cutters 25 26, which are held in position longitudinally in the socket by a pin, 28, the horizontal portions of the cutters fitting in corresponding slots in the lower end of the socket and in the slots 10 of the chuck 1.

I claim as my invention and desire to secure by Letters Patent—

1. The combination, substantially as set forth, of a chuck or socket having a conical or tapered central bore and one or more radial end slots extending from its bore to its periphery, a nut fitting a recess in the chuck concentric with the bore thereof, and a longitudinally-divided sleeve having an external screw-thread engaging the thread of the nut, and a conical or tapered bearing corresponding with the bore of the chuck on each side of said nut.

2. The combination, substantially as set forth, of a conically-bored chuck, a nut fitting a recess therein, a longitudinally-divided sleeve fitting the bore of the chuck, and having an external screw-thread engaging the thread of the nut, a boring bar or stock fitting within said sleeve, and a series of cutters secured removably in said boring-bar.

3. The combination, substantially as set forth, of a conically-bored chuck having radial slots in its end extending from its bore to its periphery, a nut fitting a recess in the chuck concentric with its bore, a longitudinally-divided sleeve fitting the bore of the chuck and having an external screw-thread engaging the thread of the nut, a cutter-socket fitting within said sleeve, and a pair of facing-cutters fixed in longitudinal slots in the cutter-socket, and fitting in the radial slots of the chuck.

L. R. FAUGHT.

Witnesses:
CHAS. E. PANCOAST,
P. M. COLLINS, Jr.